A. W. SPEDDEN.
FRICTION DISK CLUTCH.
APPLICATION FILED NOV. 12, 1912.

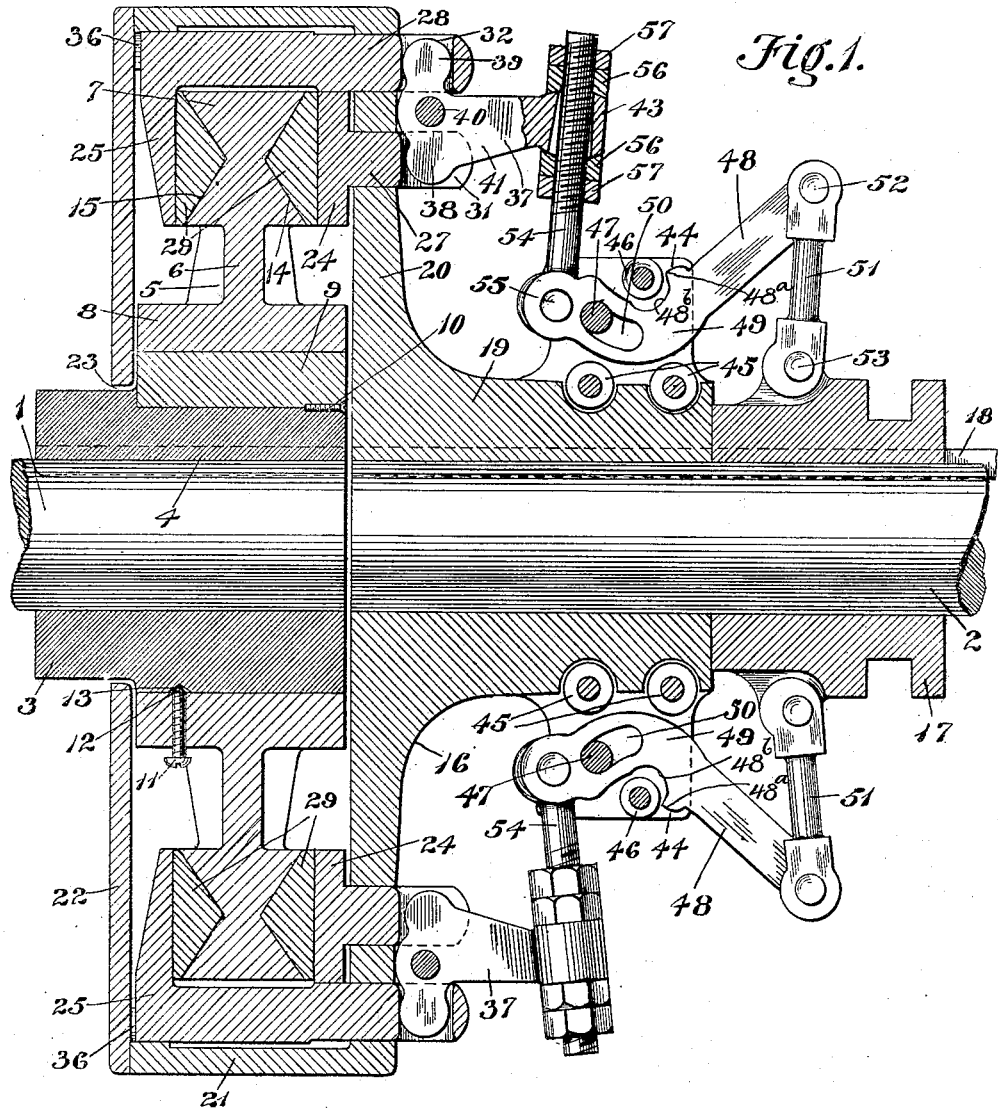
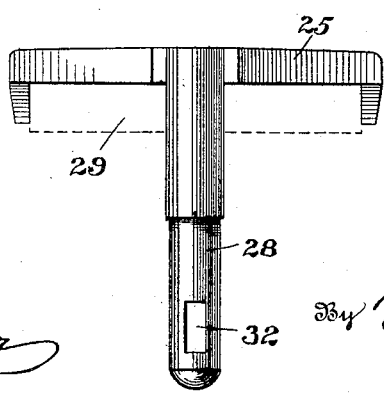

1,203,425.  Patented Oct. 31, 1916.
4 SHEETS—SHEET 2.

Witnesses
G. R. Pierce
J. A. Garner

Inventor
A. W. Spedden
By Victor J. Evans
Attorney

A. W. SPEDDEN.
FRICTION DISK CLUTCH.
APPLICATION FILED NOV. 12, 1912.
1,203,425.
Patented Oct. 31, 1916.
4 SHEETS—SHEET 3.
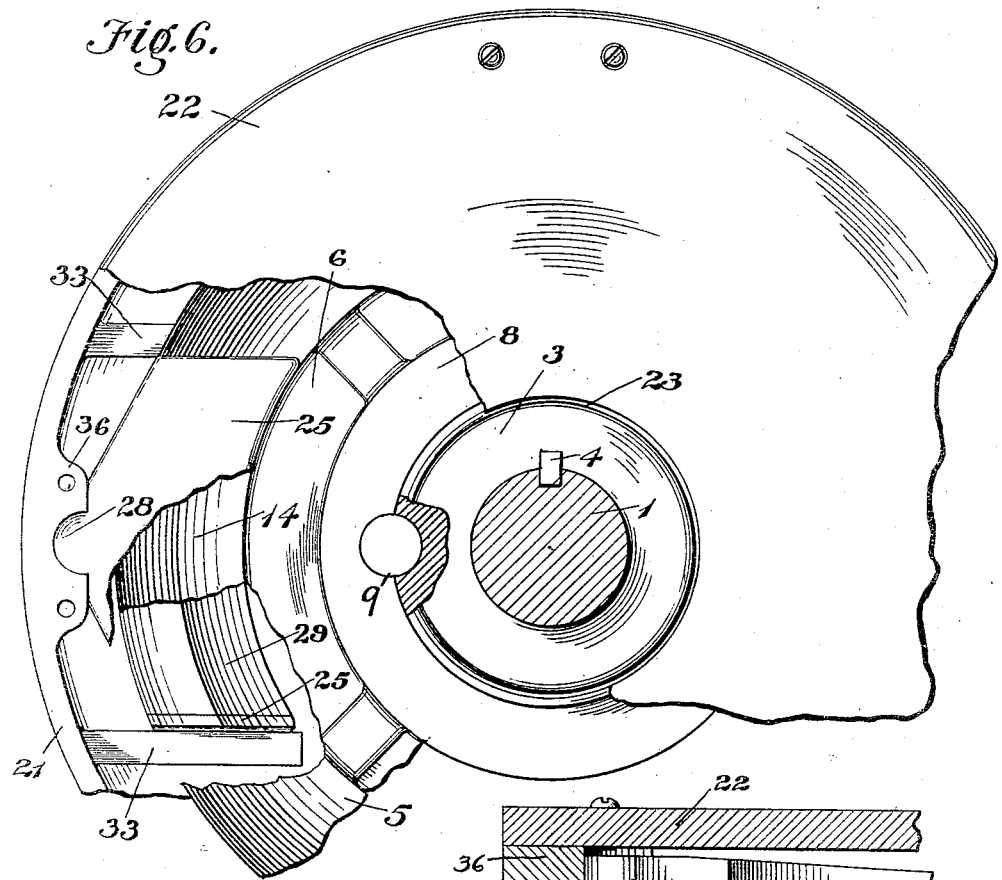
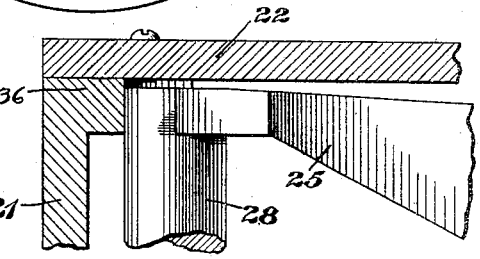
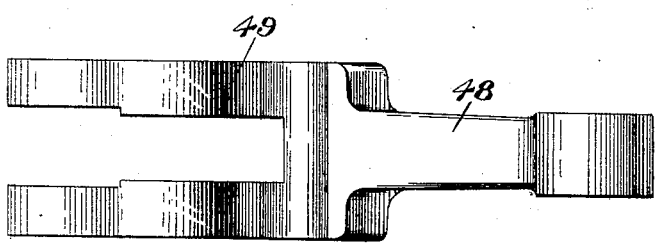
Witnesses
Inventor
A. W. Spedden
By Victor J. Evans
Attorney

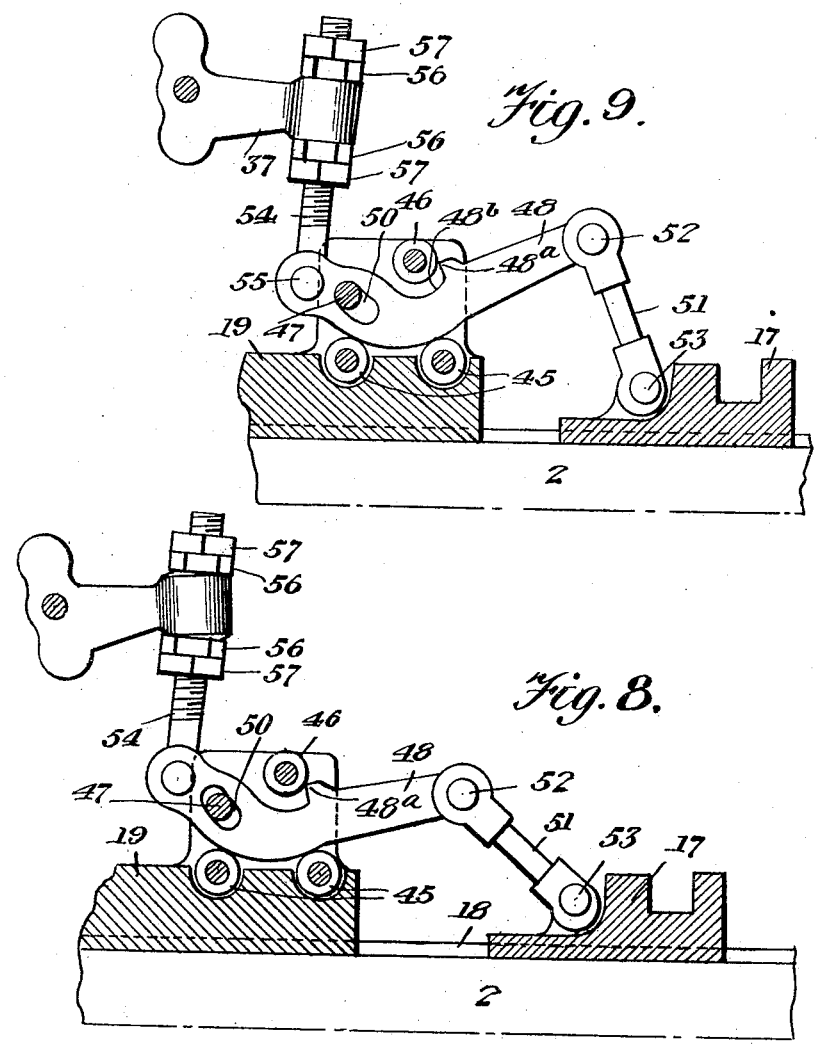

UNITED STATES PATENT OFFICE.

ALEXANDER W. SPEDDEN, OF WILMINGTON, DELAWARE, ASSIGNOR OF ONE-HALF TO WILLIAM L. HEWES, OF WILMINGTON, DELAWARE.

FRICTION-DISK CLUTCH.

1,203,425.  Specification of Letters Patent.  Patented Oct. 31, 1916.

Application filed November 12, 1912. Serial No. 730,967.

*To all whom it may concern:*

Be it known that I, ALEXANDER W. SPEDDEN, a citizen of the United States, residing at Wilmington, in the county of New Castle and State of Delaware, have invented new and useful Improvements in Friction-Disk Clutches, of which the following is a specification.

This invention is an improved friction disk clutch for use in connection with alined power transmitting shafts by means of which the portion of the shafting that is being driven may be readily stopped at any time required, the invention consisting in the construction, combination and arrangement of devices hereinafter described and claimed.

One object of my invention is to effect improvements in the construction of the lever arms and coacting parts employed for actuating the gripping disk jaws, whereby the lever arms are mounted for longitudinal and also for pivotal movement and whereby the head is provided with a plurality of fulcrum devices on which the lever arms are longitudinally shiftable and caused to successively turn, so that the lever arms progressively increase their leverage while applying the disk gripping jaws.

A further object is to provide an improved form of bell cranks for use in connection with the lever arms for actuating the disk gripping jaws.

Another object is to provide improved means for securing the friction disk on its hub.

Figure 4:
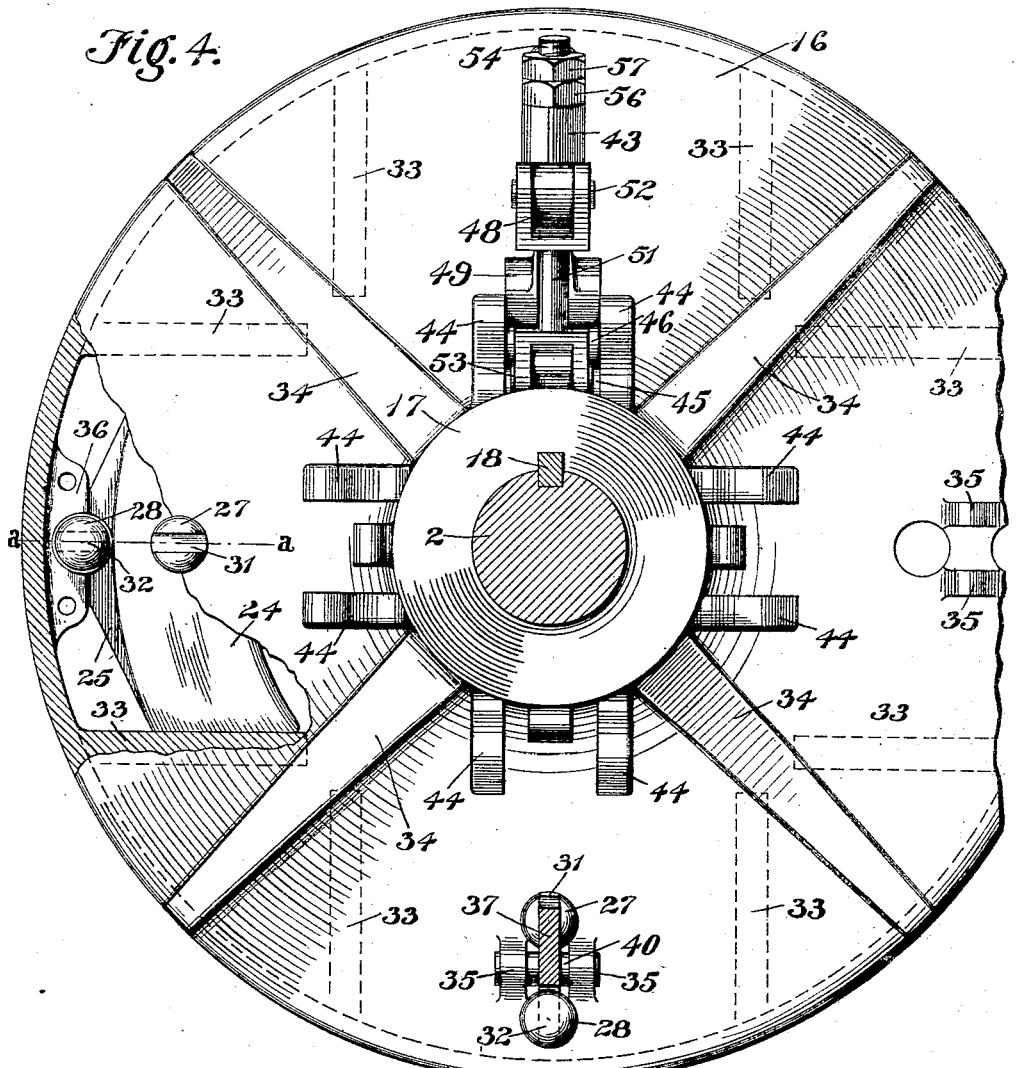
Figure 2:
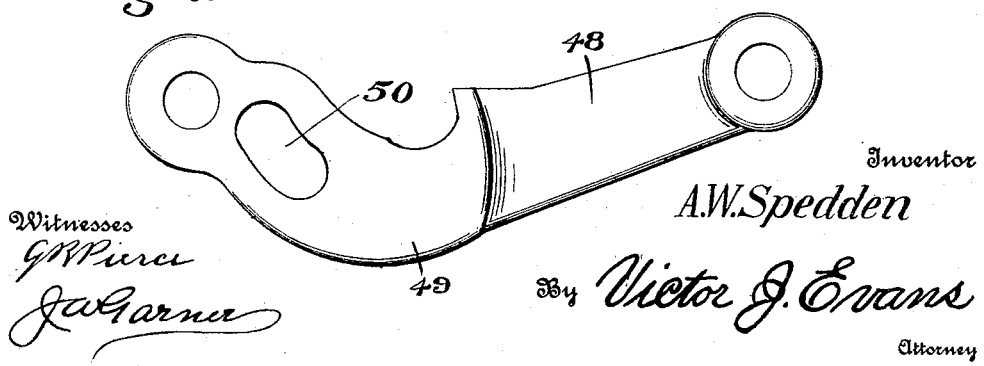

In the accompanying drawings—Figure 1 is a vertical central longitudinal sectional view of a friction disk clutch constructed in accordance with my invention. Fig. 2 is a detail side elevation of one of the lever arms. Fig. 3 is a detail plan of the same. Fig. 4 is an end elevation of my improved clutch, the driving shaft being indicated in section. Fig. 5 is a detail sectional view of the same on the plane indicated by the line *a—a* of Fig. 4. Fig. 6 is an end elevation of the reverse side of my improved clutch with a portion of the covering plate removed so as to disclose the construction of the gripping jaws. Fig. 7 is a detail plan of one of the gripping jaws. Fig. 8 is a detail sectional view showing the parts in initial unclutched position. Fig. 9 is a similar view showing the parts in an intermediate position.

The driving shaft 1 and driven shaft 2 are arranged in line with each other and with their opposing ends slightly spaced apart. On the end of the driving shaft is a hub 3 which is secured thereto by means of a key 4. The friction disk, which constitutes the driving element of the clutch is indicated at 5 and comprises a web 6, a rim portion 7 and a central eye 8. The hub 3 passes through and fits in the eye of the friction disk, the bore of the eye being such as to enable the friction disk to initially slide on the hub. In the opposing sides of the hub and the bore or eye of the disk are cylindrical longitudinal bores which are arranged at suitable regular distances apart and in which are fitted correspondingly shaped dowel pins 9. These dowels are secured in place by means of screws 10 which are fitted in openings that are made partly in one side of the dowel pins and partly in the hub 3. These dowel pins effectually prevent the friction disk from turning on its hub. To further secure the dowel pins I also provide radially arranged screws 11 which operate in threaded openings in the eye of the disk and the inner ends of which are reduced diametrically as at 12 and fit in openings 13 with which the hub is provided. The rim 7 of the friction disk is provided on opposite sides with cross sectionally V-shaped annular friction grooves 14—15.

The clutch head 16 and collar 17 are secured on the driven shaft 2 by a feather or spline 18 which enables the said collar to slide longitudinally on the shaft. The clutch head 16 has a hub portion 19, a web 20 and an annular rim 21. The web is arranged opposite one side of the friction disk 5 and the rim 21 is concentric with and extends across the said disk. To the opposite side of the rim 21 from the web 20 is secured a cover plate 22 which is circular in form and has an opening 23 through which the outer end of the hub 3 projects. Hence, the clutch head forms a circular casing which incloses and entirely conceals the friction disk and also incloses and conceals the pairs of gripping jaws 24—25 which I will now describe. The members of these pairs of gripping jaws are arranged on opposite sides of the friction disk and the said friction jaws are, respectively, provided with outwardly extending arms 27—28 which operate in openings with which the web 20 of the clutch head is provided. The arms 27 of the jaws 24 which are on what I will call the outer side of the friction disk 5 project directly out from the centers of said jaws 24. The arms 28 of the jaws 25 are arranged medially and project from parts of said jaws 25 which are without the radius of the said friction disk. The jaws are provided on their opposing sides with recesses in which are fitted friction blocks 29 which, in practice, are preferably made of hard wood such as lignum vitæ. These friction blocks are V-shaped cross sectionally and are adapted to fit in the friction grooves of the disk 5. Each arm 27 is provided in its projecting outer end with a recess 31 which is radial with reference to the driven shaft 2. Each arm 28 is provided near its corresponding end with a transverse opening 32 which also is radial to the driven shaft 2 and is in line with the recess 31 of the companion arm 27. The outer jaws 24 are engaged at their ends and prevented from turning or manifesting any tendency to turn by pairs of lugs 33 which are formed with and project from the inner side of the web 20 of the clutch head. The said web is also provided, on its outer side, with radially arranged reinforcing ribs 34 and with pairs of lugs 35 which pairs of lugs are between the arms 27—28 of the friction jaws. On the inner side of the rim 21 of the clutch head are formed guides 36 for the inner friction jaws 25.

In connection with each pair of friction jaws for clutching the sufaces of the friction grooves in opposite sides of the friction disk, I provide a bell crank lever 37 which is substantially T-shaped, provided at its inner ends with oppositely extending arms 38—39 which are rounded and, respectively fit in the recess 31 and opening 32 of the arms of said friction jaws, the bell crank lever being pivotally mounted at a point midway between the outer ends of its said arms on a pivot pin 40 which passes through an opening in the said bell crank lever and also through openings in the said lugs 35. The outwardly projecting arm 41 of each bell crank lever is provided at its outer end with an enlarged cylindrical opening 43 extending therethrough, the said opening tapering outwardly, that is to say, that end of the opening which is opposed to the hub of the clutch head is larger than the opposite or outer end thereof.

The hub 19 of the clutch head is provided with pairs of substantially radially projecting lugs 44 and between the members of the said pairs of lugs are mounted inner fulcrum rollers 45 and outer guide rollers 46. A stop pin 47 extends across the space between and connects the members of each pair of lugs 44, the said stop pins being radial with the inner member of the fulcrum rollers 45.

I also provide lever arms 48 one for use in connection with each bell crank lever 36, the said lever arms being in radial alinement with the said bell crank levers and being pivotally mounted between the pairs of ears 44. Each lever arm has a curved cam portion or surface 49 on its inner side near its inner end to bear on the rollers 45 and in connection therewith form shiftable fulcra adapting the lever arm to move longitudinally to some extent when it is turned angularly and each lever arm also has a curved stop slot 50 through which the stop pin 47 extends and which stop slot is concentric with the cam surface 49. Each lever arm also has a point 48$^a$ to engage and slide on the guide roller 46 associated with said lever arm and is further provided with a notch 48$^b$ to clear said guide roller. Links 51 are pivotally connected at their outer ends to the outer ends of the lever arms 48 as at 52 and are pivotally connected at their inner ends to the sliding collar 17 as at 53. The said sliding collar is operated by any shipper lever of usual form which is not here shown as said shipper levers are well understood by persons skilled in the art to which my invention relates.

Eye bolts 54 connect the inner ends of the lever arms 48 to the outer end of the bell crank levers 36. These eye bolts have their eyes pivotally connected to the lever arms by pivot pins 55. The shanks of the said eye bolts pass through and are angularly movable to some extent in the openings 43 of the bell crank levers and are provided with nuts 56 which engage opposite sides of said bell crank lever and jam nuts 57 which hold the nuts 56 in place and prevent them from casually turning. To facilitate the angular movement of the bolts with the nuts thereon, the ends of the bell crank levers may be rounded as at 37$^a$.

When the collar 17 is moved outwardly from the hub of the clutch head 16, the links 51 draw inwardly on the outer ends of the lever arms 48 and the said lever arms turn angularly and also move longitudinally to some extent on the fulcrum rollers 45 and thrust the eye bolts 54 outwardly thereby causing said eye bolts to turn the bell crank levers 36 outwardly and, hence, cause the cross arms of the eye bolts to move the friction jaws of each pair in opposite directions so as to release their friction blocks from the grooves of the friction disk and, hence, the friction disk is entirely disengaged and the driven shaft is totally disconnected from the driving shaft.

In order to start the driven shaft in operation the collar 17 is moved toward the hub of the clutch head thereby causing the links 51 to force the outer ends of the lever arms 48 outwardly. The initial outward movement of the lever arms causes their guide points 48ª to engage the guide rollers 46 and as the lever arms continue to move they travel substantially lengthwise, with their inner curved surfaces 49 moving on the rollers 45. The said guide rollers co-act with the said guide points to keep the surfaces 49 of the lever arms 48 in engagement with the said rollers 45. Such movement of the lever arms 48 draws the inner ends of the bolts 54 outwardly from the clutch head, the said bolts turning angularly to a slight extent in the openings or eyes 43 of the jaw actuating bell crank levers 37 and also drawing the outer ends of the bell crank levers inwardly toward the center of the clutch head, thus causing the arms 38 of said bell crank levers to move the friction jaws toward each other and apply their friction blocks to the grooves in the opposite sides of the friction disk. This movement of the lever arms is gradual and such gradual movement of such levers continues until the stop pins 47 reach the inner or left hand ends of the slots 50. Continued inner movement of the collar 17 causes the lever arms 48 to then turn on the said stop pins 47 as their second or final fulcrums, thus greatly increasing the leverage of the lever arms 48 and causing them to positively grip the gripping jaws against opposite sides of the friction disk and against all danger of slipping. The clearance notches with which they are provided enable the said lever arms to thus finally turn on the stop pins or final fulcrums 47 without interference by the guide rollers 46.

While I have herein shown and described a preferred form of my invention, I would have it understood that changes may be made in the form, proportion and construction of the several parts without departing from the spirit of my invention and within the scope of the appended claims.

I claim:—

1. In a clutch of the class described, the combination of a member having a friction disk, a member having a head, gripping jaws carried by the head and arranged to frictionally engage the friction disk, levers carried by the head and connected to the gripping jaws, lever arms carried by the head and mounted for pivotal and also for longitudinal movement, the said lever arms being connected to the levers to actuate the latter, means to operate the lever arms, and a plurality of fulcrum devices on the head and on which the lever arms are longitudinally shiftable and caused to successively turn.

2. In a clutch of the class described, a member having a friction disk, jaws to engage said disk, a member having a head, a jaw actuating lever carried by the head, a lever arm, a connection between the lever arm and the jaw actuating lever, fulcra for the lever arm, arranged on the head and on which the lever arm is shiftable longitudinally and caused to successively turn to vary the leverage of said lever arm, and means to operate the lever arm.

3. In a clutch of the class described, the combination of a member having a friction disk, a member having a head, a pair of gripping jaws carried by the head and arranged to engage opposite sides of the friction disk, a bell crank lever fulcrumed to the head and having oppositely extending arms engaging said gripping jaws and arranged to operate the same, a lever arm pivotally connected to the head, said head having a plurality of fulcrums for the lever arm on which the latter is shiftable longitudinally and caused to successively turn, a connection between the lever arm and the bell crank lever, and means to operate the lever arm.

4. In a clutch of the class described, the combination of a member having a friction disk, a member having a head, a pair of gripping jaws carried by the head and arranged to engage opposite sides of the friction disk, a bell crank lever fulcrumed to the head and having oppositely extending arms engaging said gripping jaws and arranged to operate the same, a lever arm pivotally connected to the head, said head having fulcra for the lever arm on which the latter is shiftable longitudinally to vary the leverage of said lever arm, a bolt pivotally connected to the lever arm and also connected to said bell crank lever for angular movement therein, said bolt being provided with means for adjusting the same with respect to the bell crank lever, a connection between the lever arm and the bell crank lever, and means to operate the lever arm.

5. In a clutch of the class described, a member having a head, a jaw actuating lever carried by the head, a lever arm having a curved cam face on one side and also having a curved slot substantially concentric with said cam face, said lever arm being mounted for pivotal and also for longitudinal movement, fulcrum rollers on the head and on which the curved cam face of the said lever is longitudinally slidable and a fulcrum pin also on the head and extending through said slot of said lever, and means to operate said lever arm.

6. In a clutch of the class described, a member having a head, a jaw actuating lever carried by the head, a lever arm having a curved cam face on one side and also having a curved slot substantially concentric with said cam face, said lever arm being mounted for pivotal and also for longitudinal movement, fulcrum rollers on the head and on which the curved cam face of the said lever is longitudinally slidable and a fulcrum pin also on the head and extending through said slot of said lever, the said head being also provided with a guide roller arranged in spaced relation to one of the first-named rollers, said lever arm being arranged between said guide roller and said first-named rollers and being provided with a point to engage and slide on said guide roller.

In testimony whereof I affix my signature in presence of two witnesses.

ALEXANDER W. SPEDDEN.

Witnesses:
 WM. L. HEWES,
 CHARLES W. BUSH.

Copies of this patent may be obtained for five cents each, by addressing the "Commissioner of Patents, Washington, D. C."